(No Model.)
D. BRIGHAM.
WATERING TROUGH FOR HOGS.
No. 494,732. Patented Apr. 4, 1893.
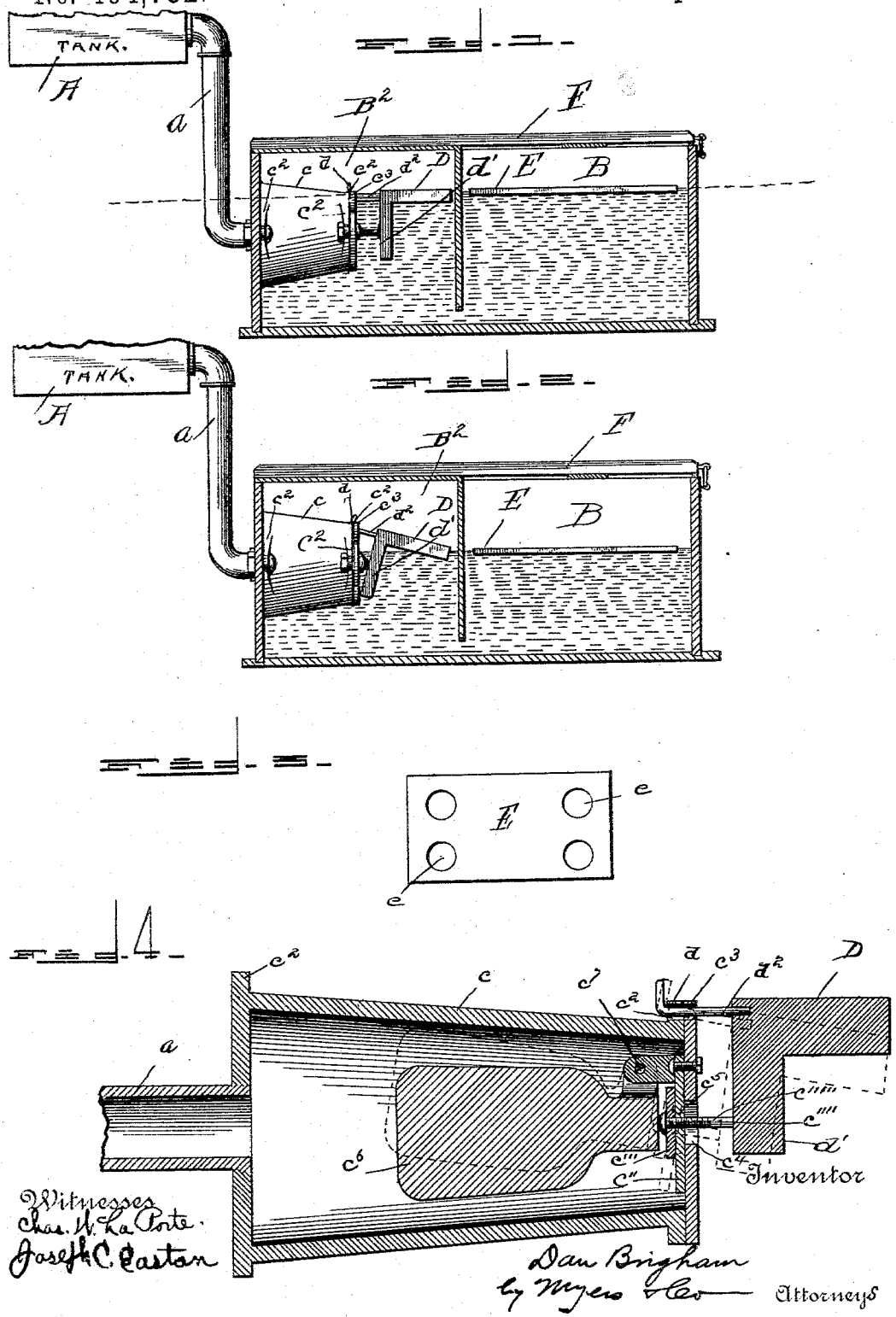

UNITED STATES PATENT OFFICE.

DAN BRIGHAM, OF SCHUYLER, NEBRASKA.

WATERING-TROUGH FOR HOGS.

SPECIFICATION forming part of Letters Patent No. 494,732, dated April 4, 1893.

Application filed August 23, 1892. Serial No. 443,838. (No model.)

*To all whom it may concern:*

Be it known that I, DAN BRIGHAM, a citizen of the United States of America, residing at Schuyler, in the county of Colfax and State of Nebraska, have invented certain new and useful Improvements in Watering-Troughs for Hogs, of which the following is a specification, reference being had therein to the accompanying drawings.
This invention relates to certain new and useful improvements on a device generally known as "a stock watering trough" and more particularly as a "hog waterer" for which Patent No. 422,113 was granted me on February 25, 1890.

The object of the invention is to provide suitable means, whereby the trough proper shall be automatically supplied with water, furthermore, whereby said water supply shall be so regulated, as to preserve a predetermined level in said trough.

A further object is to provide such peculiar construction in a watering trough whereby the water or other substance contained therein shall be protected and kept entirely free from all foreign substances, such as dust, dirt, &c.

Finally the object of the invention resides in the provision of a "stock watering trough," that shall be strong, durable, thoroughly efficient in use and comparatively inexpensive of manufacture.

With these objects in view the invention consists in various novel details of construction, combinations and arrangements of parts to be hereinafter more fully set forth and claimed.

In describing my invention in detail, reference is had to the accompanying drawings forming a part of this specification, wherein like letters indicate corresponding parts in the several views, in which—

Figure 1, is a view in longitudinal section of one form of device embodying my improvements and showing the water inlet valve closed. Fig. 2, is a similar view showing the valve opened. Figs. 3 and 4, are views in detail, showing more clearly the interior construction, &c.

In the drawings, A, indicates the supply tank, communicating with the chamber $B^2$, of the trough B, through the pipe $a$; this chamber $B^2$, is provided with a gravity valve adapted for regulating the inflow of water and comprising the body portion $c$, having the end flanges $c^2$, the cap $c^3$, apertured at $c^4$, and the flapvalve $c^5$, covering said aperture. This, flapvalve $c^5$, consists of the flexible disks $c''$, washer $c'''$, and screw threaded rods $c''''$, connecting said disk and washer and projecting slightly as at $c'''''$. A weight $c^6$, pivotally secured as at $c^7$, is adapted for normally holding said valve $c^5$, closed, as is clearly shown in Fig. 3. Detachably secured to this valve C, as at $d$, $d^2$, is a float D, having a depending ledge $d'$ formed on the side adjacent said valve and adapted to engage a projecting rod or stud $c''''$, to open the valve and admit water to the trough, as is clearly shown in Fig. 2.

Referring to Figs. 1, 2, and 4, E, represents a second float, rectangular in form and adapted for covering and protecting the water contained in the trough against the entrance of any foreign matter. This float is provided with a number of apertures $e$, whereby the animals may find ready access to the water and at the same time preventing their wading therein or otherwise polluting the same. A cover F, is provided for further protecting the water and obviating the possibility of displacement of the float E, in case of an overflow.

The operation of the invention is as follows: Water from the tank A, fills the chamber B, $B^2$, to a depth as indicated by dotted lines in Fig. 1, and after a certain portion has been consumed and the water falls carrying with it the float D; the ledge $d'$, of the latter coming in contact with the projecting rod $c''''$, opens the valve to admit sufficient water from the tank to refill the trough, as will be readily understood.

It will be particularly noted that various changes may be made in the detail construction without materially departing from the general idea involved.

Having fully described my invention, what I claim, and desire to secure by Letters Patent, is—

In a watering trough, the communicating chambers B, B², the cover F, the casing c, inclosing the gravitating valve substantially as described, the water supply tank connecting by pipes with the said casing c, the float D, and the float E, provided with openings e, as specified.

In testimony whereof I affix my signature in presence of two witnesses.

DAN BRIGHAM.

Witnesses:
J. A. GRIMISON,
W. M. CAIN.